(12) United States Patent
Horade

(10) Patent No.: US 9,609,168 B2
(45) Date of Patent: Mar. 28, 2017

(54) PRINTING APPARATUS

(71) Applicant: BROTHER KOGYO KABUSHIKI KAISHA, Nagoya, Aichi (JP)

(72) Inventor: Kenta Horade, Tokai (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/080,710

(22) Filed: Mar. 25, 2016

(65) Prior Publication Data

US 2016/0295065 A1    Oct. 6, 2016

(30) Foreign Application Priority Data

Mar. 31, 2015 (JP) ................. 2015-074319

(51) Int. Cl.
| | |
|---|---|
| *G06F 15/00* | (2006.01) |
| *H04N 1/23* | (2006.01) |
| *H04N 1/00* | (2006.01) |
| *H04N 1/034* | (2006.01) |
| *B41J 2/01* | (2006.01) |

(52) U.S. Cl.
CPC ............ *H04N 1/2346* (2013.01); *B41J 2/01* (2013.01); *H04N 1/00015* (2013.01); *H04N 1/0032* (2013.01); *H04N 1/00037* (2013.01); *H04N 1/00084* (2013.01); *H04N 1/00551* (2013.01); *H04N 1/00689* (2013.01); *H04N 1/00694* (2013.01); *H04N 1/00795* (2013.01); *H04N 1/00896* (2013.01); *H04N 1/034* (2013.01); *H04N 2201/0094* (2013.01)

(58) Field of Classification Search
USPC ................................ 358/1.13–1.18
See application file for complete search history.

(56) References Cited

U.S. PATENT DOCUMENTS

2015/0092209 A1*    4/2015  Miyake ............ H04N 1/00954
                                                           358/1.13

FOREIGN PATENT DOCUMENTS

| JP | 2005-238710 A | 9/2005 |
|---|---|---|
| JP | 2008-205616 A | 9/2008 |
| JP | 2013-71407 A | 4/2013 |

* cited by examiner

*Primary Examiner* — Saeid Ebrahimi Dehkord
(74) *Attorney, Agent, or Firm* — Scully, Scott, Murphy & Presser, PC

(57) ABSTRACT

A printing apparatus, including an image reader unit, a printer unit, and a controller, is provided. The controller executes an image reading process; a printing process; a standby process to hold the printer unit in a second condition, wherein the printer unit is enabled to print through a preparatory action, on standby during a time period between completion of the printing process and elapse of a standby period; a shifting process to shift the printer unit from the second condition to a first condition, wherein the preparatory action is required to enable the printer unit to print; and a changing process, wherein, if a document cover in the image reading unit is open during the time period between the completion of the printing process and elapse of the standby period, the standby period is changed from a first period to a second period that is longer than the first period.

8 Claims, 7 Drawing Sheets

PRINTING APPARATUS

CROSS REFERENCE TO RELATED APPLICATION

This application claims priority from Japanese Patent Application No. 2015-074319, filed on Mar. 31, 2015, the entire subject matter of which is incorporated herein by reference.

BACKGROUND

Technical Field

An aspect of the present disclosure relates to a printing apparatus.

Related Art

A multi-functional printer (MFP) having multiple functions such as a printing function, a copier function, and a scanning function, is known. The MFP may print images on a printable medium in an inkjet-printing method, and in order to restrain incorrect ejection of ink from nozzles of a printing head, the MFP may perform a recovery operation, in which ink is preliminarily ejected through the nozzles.

For example, an inkjet-printable MFP, which may detect an opening and closing motion of a cover that covers a sheet of original document placed on a document base, is known. When the MFP detects the opening and closing motion of the cover, and when the recovery operation for the printing head is determined to be necessary, the MFP may perform the recovery operation.

SUMMARY

In the above-mentioned MFP, the recovery operation may be triggered by the opening and closing motion of the cover, which is opened and closed after an image on the sheet of original document placed on the document base is read and image data for the read image is generated in a preceding image reading operation, to set another sheet of original document to be read on the document base in a following image reading operation. However, in this flow of continued operations, a capping process, which may be performed in order to protect the printing head once a printing operation is completed, is not taken into consideration.

For example, a user may wish to repeat a copying operation, in which the user opens the cover to set a sheet of original document on the document base and closes the cover to have an image on the sheet read by the reading function in the MFP and have a duplicate of the read image printed by the printing function in the MFP, continuously. In this case, after a first copying operation is completed, and if a predetermined length of time elapses before the user inputs a next copying operation, the MFP, not knowing that the next copying operation might be entered, may perform the capping process to protect the printing head. Therefore, by the time the user inputs the next copying operation after the capping operation, the MFP may need to perform an uncapping process to uncap the printing head, and onset of the next copying operation may be delayed by the uncapping process.

The present disclosure is advantageous in that a printing apparatus, which may restrain a next printing operation from being delayed when a printing operation to read an image and print a duplicated image is repeated, is provided.

According to an aspect of the present disclosure, a printing apparatus, including an image reader unit, a printer unit, and a controller, is provided. The image reader unit includes a document base, a document cover, and a cover sensor configured to detect an opening-closing motion of the document cover. The printer unit is configured to shift between a first condition, which requires a preparatory action in order to enable the printer unit to print an image, and a second condition, in which the printer unit is enabled to print the image through the preparatory action. The controller is configured to execute an image reading process, in which the controller manipulates the image reader unit to read an original document placed on the document base and generate image data; a printing process, in which the controller manipulates the printer unit to print an image according to the generated image data on a printable medium; a standby process, in which the controller holds the printer unit in the second condition on standby for shifting to the first condition during a time period between completion of the printing process and elapse of a standby period; a shifting process, in which, after elapse of the standby period, the controller manipulates the printer unit to shift from the second condition to the first condition; and a changing process, in which, if the controller detects the document cover being open based on output from the cover sensor during the time period between completion of the printing process and elapse of the standby period, the controller changes the standby period from a first period to a second period that is longer than the first period, the first period being the standby period for the printer unit to be held on standby when the controller does not detect the document cover being open during the time period between completion of the printing process and elapse of the standby period.

According to another aspect of the present disclosure, a non-transitory computer-readable medium storing computer-readable instructions that are executable by a controller coupled with a printing apparatus is provided. The printing apparatus includes an image reader unit with a document base, a document cover, and a cover sensor configured to detect an opening-closing motion of the document cover; and a printer unit configured to shift between a first condition, which requires a preparatory action in order to enable the printer unit to print an image, and a second condition, in which the printer unit is enabled to print the image through the preparatory action. The computer-readable instructions cause the printing apparatus, when executed by the controller, to perform an image reading process, in which the controller manipulates the image reader unit to read an original document placed on the document base and generate image data; a printing process, in which the controller manipulates the printer unit to print an image according to the generated image data on a printable medium; a standby process, in which the controller holds the printer unit in the second condition on standby for shifting to the first condition during a time period between completion of the printing process and elapse of a standby period; a shifting process, in which, after elapse of the standby period, the controller manipulates the printer unit to shift from the second condition to the first condition; and a changing process, in which, if the controller detects the document cover being open based on output from the cover sensor during the time period between completion of the printing process and elapse of the standby period, the controller changes the standby period from a first period to a second period that is longer than the first period, the first period being the standby period for the printer unit to be held on standby when the controller does not detect the document cover being open during the time period between completion of the printing process and elapse of the standby period.

BRIEF DESCRIPTION OF THE ACCOMPANYING DRAWINGS

DETAILED DESCRIPTION

Hereinafter, a printing apparatus 1 according to embodiments of the present disclosure will be described with reference to the accompanying drawings. It is noted that various connections are set forth between elements in the following description. These connections in general, and unless specified otherwise, may be direct or indirect, and this specification is not intended to be limiting in this respect. Aspects of the present disclosure may be implemented on circuits, such as application specific integrated circuits (ASICs), or in computer software as programs storable on computer-readable media including, but not limited to, RAMs, ROMs, flash memories, EEPROMs, CD-media, DVD-media, temporary storage, hard disk drives, floppy drives, permanent storage, and the like.

In the following description, identical parts or items may be referred to by a same reference sign, and repetitive explanation of those will be omitted. While the accompanying drawings may illustrate aspects of a configuration of the printing apparatus 1 including elements that are necessary in the present disclosure, some of parts and items that may not be related to the description of the present invention may be omitted. Further, the present embodiment may not necessarily be limited to the embodiment described below.

First Embodiment

[Overall Configuration of the Printing Apparatus]

Figure 1:
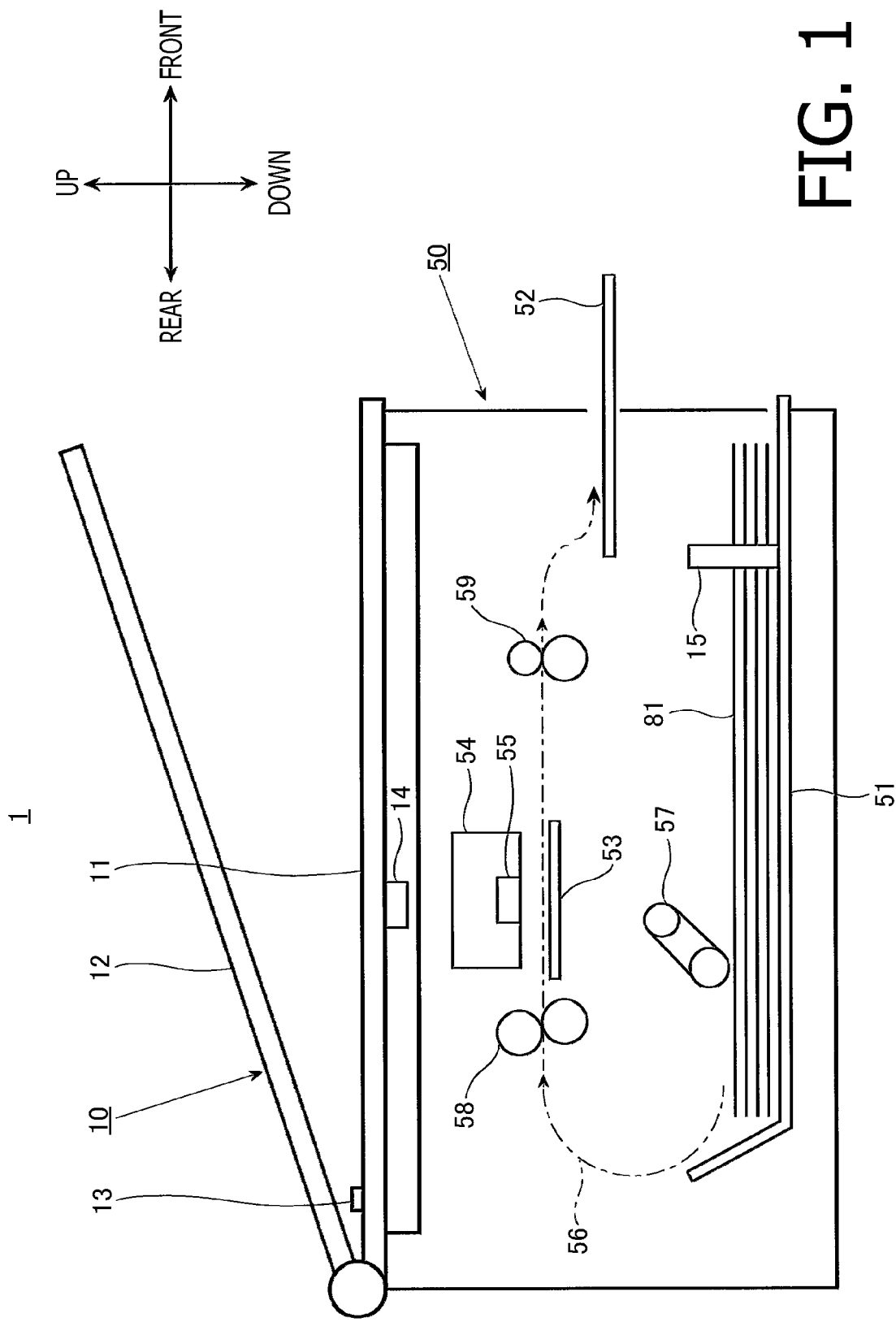
FIG. 1 illustrates an overall configuration of a printing apparatus according to a first embodiment of the present disclosure.

In the following description, directions concerning the printing apparatus 1 and each part or component included in the printing apparatus 1 may be mentioned based on orientations indicated by arrows shown in FIG. 1. For example, a viewer's right-hand side and left-hand side in FIG. 1 are defined as a front side and a rear side, respectively. An upper side and a lower side in FIG. 1 correspond to an upper side and a lower side of the printing apparatus 1 respectively. A right-to-left or left-to-right direction of the printer 1 may also be referred to as a right-left direction or a widthwise direction. An up-to-down or down-to-up direction may also be referred to as a vertical direction. A front-to-rear or rear-to-front direction may be referred to as a front-rear direction or a direction of depth.

As shown in FIG. 1, the printing apparatus 1 in the first embodiment includes an image reader unit 10 in an upper position and a printer unit 50 in a lower position. The printing apparatus 1 is configured such that an original image on an original document (not shown) may be read by the image reader unit 10 and the printer unit 50 may print a duplicated image on a printable medium 81 according to image data generated in the image reader unit 10.

The image reader unit 10 may include a document base 11, a document cover 12, a cover sensor 13, and an image sensor 14. The image sensor maybe a contact image sensor (CIS).

The image reader unit 10 may read the original image on a sheet of original document placed on the document base 11 by the image sensor 14 and generate image data corresponding to the read image. The generated image data may be output to a controller 100, which will be described later in detail.

The cover sensor 13 may detect an opening and closing motion of the document cover 12 and output signals indicating an open or closed condition of the cover to the controller 100. In the present embodiment, the cover sensor 13 is disposed in a vicinity of a rotation shaft (unsigned) of the document cover 12, e.g., a rearward position in the image reader unit 10. However, the position of the cover sensor 13 may not necessarily be limited to the rearward position, but the cover sensor 13 may be disposed at, for example, a frontward position on the document cover 12.

The printer unit 50 includes a feeder tray 51, an ejection tray 52, a platen 53, and a carriage 54. The printer unit 50 may print an image on the printable medium 81 fed from the feeder tray 51 and eject the printable medium 81 with the printed image to the ejection tray 52.

In an upper position with respect to the feeder tray 51, disposed is the platen 53 being a flat plate. In a further upper position with respect to the platen 53, disposed is the carriage 54, on which a printing head 55 to eject ink through nozzles toward the platen 53 is mounted. In a frontward position with respect to the platen 53, disposed is the ejection tray 52. A conveyor path 56 is formed through the printer unit 50 in a range from a rearward position of the feeder tray 51 to a rearward position of the ejection tray 52.

The printer unit 50 includes a media sensor 15, which may output signals indicating an amount of the printable media 81 in the feeder tray 81 to the controller 100. In other words, the media sensor 15 may output signals that indicate presence or absence of the printable medium 81 in the feeder tray 51. The controller 100 may determine a remaining amount of the printable media 81 in the feeder tray 81 based on the signals received from the media sensor 15. The media sensor 15 may be a known remaining amount detectable sensor (e.g., a sensor with a variable resistor).

The printer unit 50 may further include a media conveyor 70 to convey the printable medium 81 along the conveyor path 56. The media conveyor 70 may include a feeder roller unit 57, a conveyor roller unit 58, and an ejection roller unit 59.

Figure 2:
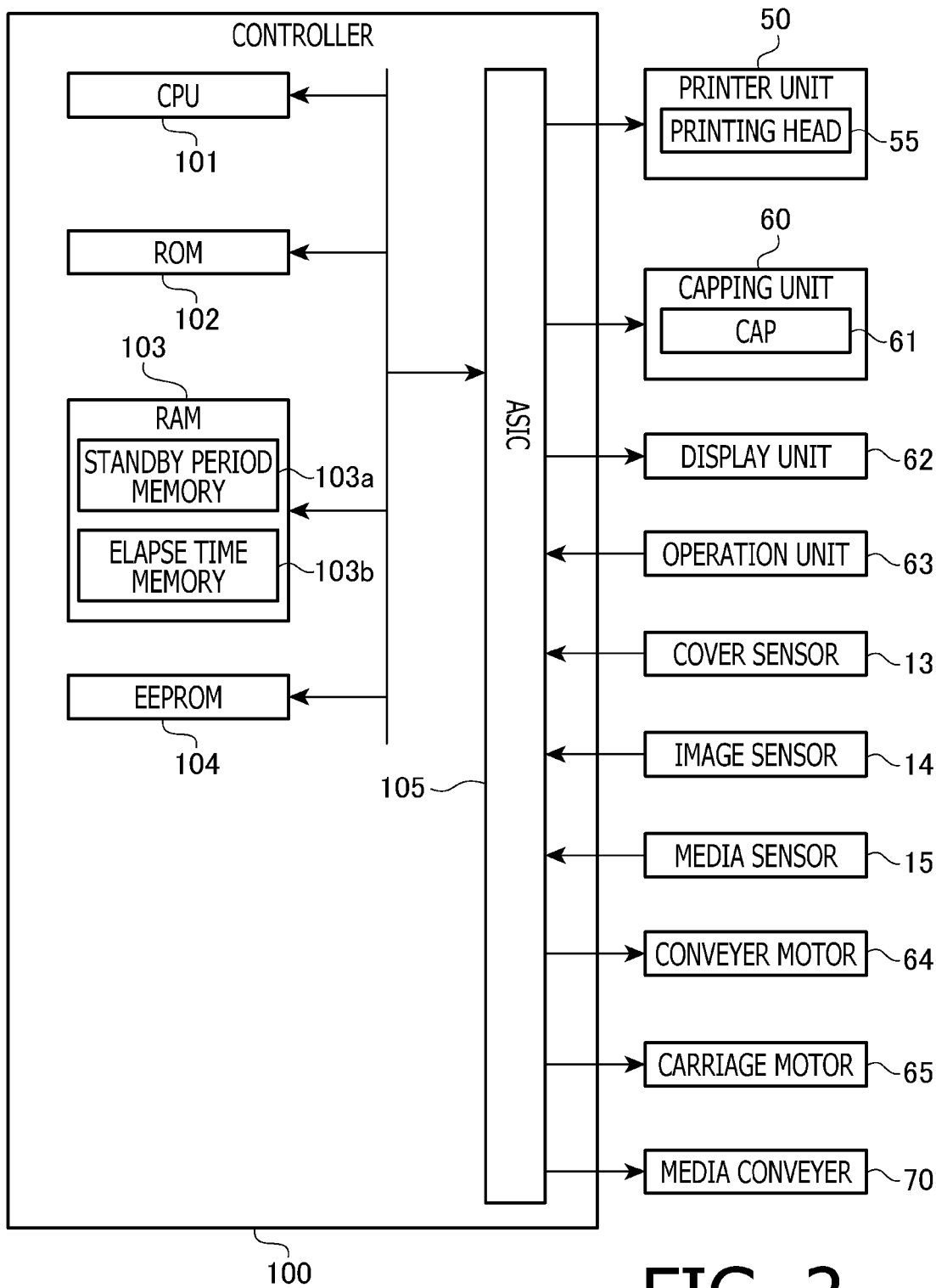
FIG. 2 is a block diagram to illustrate electrical configuration of the printing apparatus according to the first embodiment of the present disclosure.

Next, a detailed configuration including an electrical configuration of the printing apparatus 1 will be described with reference to FIG. 2. As shown in FIG. 2, the printing apparatus 1 includes a capping unit 60 to move a cap 61, a display unit 62, an operation unit 63, and the controller 100.

The cap 61 is movable between a contact position and a separated position by the capping unit 60. In the contact position, when the printing apparatus 1 is not performing a printing operation, the cap 61 is placed to contact an ink ejecting surface of the printing head 55. In the following description, a behavior of the cap 61 to be placed in the contact position to contact the ink ejecting surface of the printing head 55 may be referred to as capping. The capping may restrain the ink on the ink ejecting surface of the printing head 55 from drying so that incorrect or irregular ejection of the ink from may be restrained. The cap 61 is separated from the printing head 55 when the printing apparatus 1 performs the printing operation. In other words, the cap 61 is in the separated position during the printing operation, and when the cap 61 in the separated position, the printing head 55 is uncapped.

The printing operation may include a process, in which the controller 100 manipulates the printing head 55 to eject ink, and a process, in which the controller 100 manipulates the media conveyor 70 to convey the printable medium 81. While the controller 100 repeats the procedures alternately or simultaneously, an image is printed on the printable medium 81 being conveyed by the media conveyor 70.

The display unit 62 may display information to the user. For example, the display unit 62 may display messages, including information to be noted by the user, thereon. The display unit 62 may be, for example, but not limited to, a liquid crystal display or an organic light-emitting (EL) display.

The operation unit 63 includes an input interface, through which commands or selection from the user may be entered and accepted. The operation unit 62 may include a touch-sensitive panel. Alternatively or optionally, the operation unit 63 may include a plurality of buttons that may be pressed by the user.

The controller 100 may include a first board and a second board. On the first board, a central processing unit (CPU) 101, a read-only memory (ROM) 102, a random-access memory (RAM) 103, and an electrically erasable programmable ROM (EEPROM) 104 may be mounted. On the second board, an application-specific integrated circuit (ASIC) 105 may be mounted. The ASIC 105 may be connected with the image sensor 14, the media sensor 15, the printing head 55, a conveyor motor 64 to drive the media conveyor 70, and a carriage motor 65 to move the carriage 54.

The CPU 101 may, when a print job is input from an external device (not shown), such as a personal computer (PC), output a command to execute the print job to the ASIC 105 based on a program stored in the ROM 102. The ASIC 105 receiving the command may activate driver programs according to the command. Thus, the printing operation may be implemented by the controller 100.

The RAM 103 is a memory device to temporarily store various types of information. The RAM 103 may include a standby period memory 103a and an elapse time memory 103b.

The standby period memory 103a may store information regarding a standby period. The standby period is a time period between completion of a printing operation with a printable medium 81 and onset of a capping process, in which the cap 61 covers the ink ejecting surface of the printing head 55. The information regarding the standby period may be, for example, a first-period flag and a second-period flag, which will be described later in detail. The elapse time memory 103b may store information regarding a length of a time period since the completion of the printing operation with the printable medium 81.

Completion of the printing operation may refer to a timing, at which image printing on a last sheet of the printable media 81, when images are printed on a plurality of printable media 81 continuously, or on a single sheet of printable medium 81, is completed. For example, the completion of the printing operation may refer to a timing, at which a last droplet of ink to form a last dot on the last sheet of the printable media 81 or on the single sheet of the printable medium 81 is completely ejected.

[Behaviors of the Printing Apparatus]

Next, behaviors of the printing apparatus 1 in the first embodiment will be described with reference to FIGS. 1-3.

Figure 3:
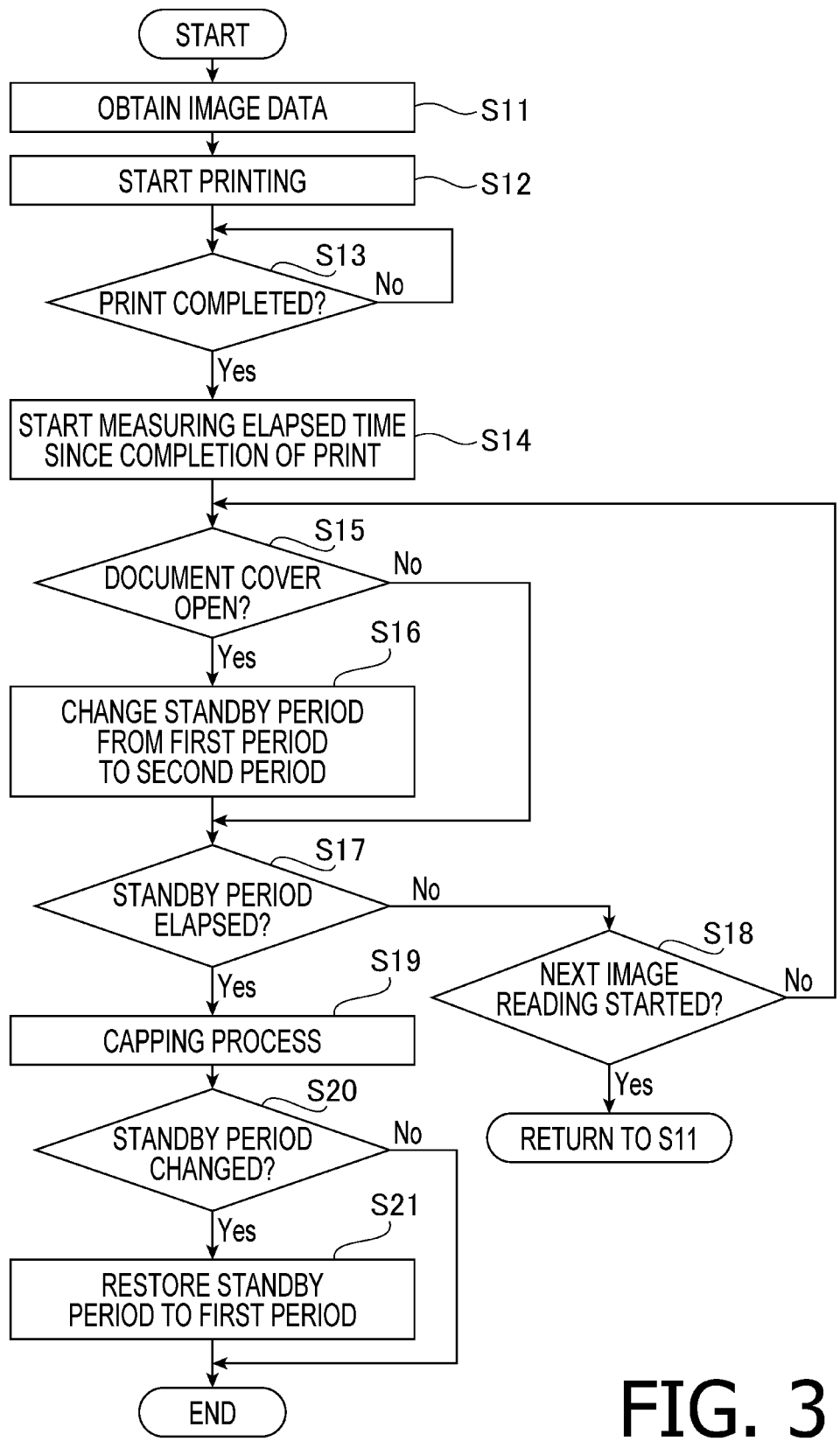
FIG. 3 is a flowchart to illustrate an operation to be executed by a controller of the printing apparatus according to the first embodiment of the present disclosure.

FIG. 3 illustrates a flow of processes to be executed by the controller 100 according to a program to implement a first operation. The program to be executed by the controller 100 may be stored in, for example, the ROM 102.

The first operation may be activated when, for example, the user sets a sheet of original document on the document base 11, closes the document cover 12, and operates the operation unit 63 to press a button (not shown) to input a command for copying. According to the operation corresponding to the copying command, the first operation illustrated in the flowchart shown in FIG. 3 is executed by the controller 100.

As shown in FIG. 3, in an image reading process in S11, the controller 100 manipulates the image sensor 14 in the image reader unit 10 to read an image of a sheet of original document and generate image data. The controller 100 obtains the generated image data.

In S12, the controller 100 executes the printing operation by using the image data obtained in S11. Prior to onset of the printing operation, the controller 100 executes a preparatory action, in which the controller 100 manipulates the capping unit 60 to move the cap 61 from the contact position to the separated position so that the cap 61 is separated from the printing head 55.

Thereby, the printer unit 50 shifts from a first condition, in which the printing head 55 is capped by the cap 61, through the preparatory action, to a second condition, in which the printing head 55 is uncapped. Thus, the controller 100 places the printing head 55 in the second condition and thereafter executes the printing operation, in which the controller 100 manipulates the printer unit 50 to print an image corresponding to the obtained image data.

In S13, the controller 100 determines whether the printing operation with the image data is completed. If the printing operation is determined to be completed (S13: YES), the controller 100 starts a standby process and proceeds to S14. While the controller 100 executes the standby process, the printer unit 50 is maintained in the second condition, in which the printing head 55 is not capped by the cap 61. In other words, the controller 100 holds the printer unit 50 in the second condition on standby for shifting to the first condition.

In S14, the controller 100 starts measuring a length of the time period elapsed since the completion of the printing operation with the printable medium 81, i.e., from the time, at which the controller 100 made the affirmative determination in S13 (S13: YES), and writes each elapsed time period in the elapse time memory 103b. In S15, the controller 100 determines whether the document cover 12 is open based on the signals output from the cover sensor 13.

If the controller 100 determines that the document cover 12 is not open (S15: NO), the controller 100 proceeds to S17, which will be described later. If the controller 100 determines that the document cover 12 is open (S15: YES), the controller 100 proceeds to S16.

In S16, the controller 100 executes a changing process, in which the controller 100 updates the standby period from a first period to a second period. More specifically, the controller 100 sets the first-period flag and the second-period flag in the standby period memory 103a off and on respectively. The standby period memory 103a has an area reserved for the first-period flag and an area reserved for the second-period flag. By default, the first-period flag is set on, and the second-period flag is set off.

The standby period refers to a time period, in which the printing head 55 stands by without being capped by the cap 61 after the completion of the printing operation. The first period refers to a length of the standby period, which is used if, at the time of the completion of the printing operation, the document cover 12 being in the closed condition is detected by the output from the cover sensor 13. The first period may be prepared in advance and stored in the ROM 102 or the EEPROM 104. The first period may be, for example, five (5) seconds. The second period refers to a length of the standby period, which is longer than the first period. The second period may be, for example, 10 seconds.

Following S16, or the negative determination in S15 (S15: NO), in S17, the controller 100 determines whether the standby period since the completion of the printing operation, having been measured since S14, has elapsed. The standby period in S16 may be either the first period or the second period. If the controller 100 proceeded to S17 from S15, skipping S16, the standby period remains unchanged as the first period. On the other hand, if the controller 100 proceeded to S17 after S16, the standby period has been changed to the second period.

In S17, if the controller 100 determines that the standby period since the completion of the printing operation has not elapsed (S17: NO), in S18, the controller 100 determines whether a next image reading operation started. If the controller 100 determined that the next image reading operation started (S18: YES), the controller 100 returns to S11 and repeats a flow of S11-S18. On the other hand, if the controller 100 determines that no next image reading operation started (S18: NO), the controller 100 returns to S15 and repeats a flow of S15-S18 until the standby period elapses.

Meanwhile, in S17, if the controller 100 determines that the standby period since the completion of the printing operation elapsed (S17: YES), in S19, the controller 100 executes a shifting process, in which the controller 100 manipulates the printer unit 50 to shift from the second condition to the first condition, i.e., the capping process to place the cap 61 to contact the ink ejecting surface of the printing head 55.

More specifically, the capping unit 60 is manipulated to move the cap 61 from the separated position to the contact position, in which the cap 61 contacts the ink ejecting surface of the printer head 55. Thus, the printer unit 50 shifts from the second condition, in which the printing head 55 is not covered by the cap 61, to the first condition, in which the printing head 55 is covered by the cap 61.

In S20, the controller 100 determines whether the standby period has been changed. If the controller 100 determines that the standby period has been changed from the first period to the second period in S16 (S20: YES), in S21, the controller 100 restores the standby period to the first period. More specifically, the controller 100 may update the standby period by setting the first-period flag in the standby period memory 103a on and setting the second-period flag in the standby period memory 103a off. Thereafter, the controller 100 ends the first operation. On the other hand, in S20, if the standby period has not been changed in S16 from the first period to the second period (S20: NO), the controller 100 ends the first operation without changing the standby period.

According to the printing apparatus 1 described above, if the document cover 12 being open is detected within the standby period since the completion of the printing operation, the standby period is extended from the first period to the second period so that the second condition in the printer unit 50, in which the printing head 55 is not covered by the cap 61, is maintained, and the next printing operation may be started smoothly and promptly with the uncapped printing head 55. Thus, when the printing operations are executed one after another continuously, onset of the latter printing operation may be restrained from delayed.

MODIFIED EXAMPLE

A modified example of the printing apparatus 1 with reference to the first embodiment of the present disclosure will be described below.

[Behaviors of the Printing Apparatus]

Modified behaviors of the printing apparatus 1 in the present embodiment will be described with reference to FIGS. 4A and 4B. In the following description, parts, items, or steps that are identical to those described in the above embodiment will be referred to by same reference signs or step numbers, and redundant explanation of those will be herein omitted.

Figure 4A:
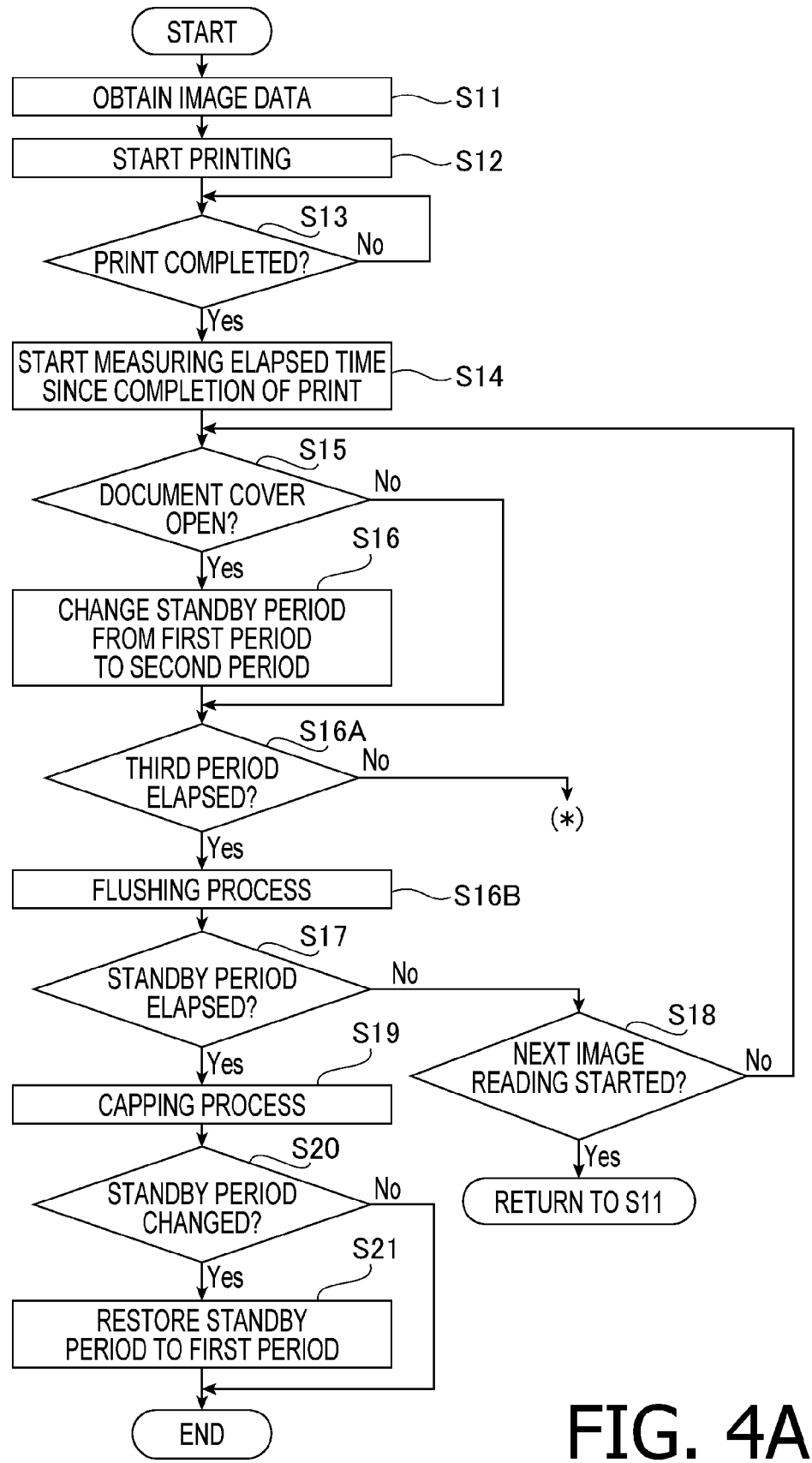
FIGS. 4A and 4B are flowcharts to illustrate an operation to be executed by the controller of the printing apparatus according to a modified example of the first embodiment of the present disclosure.
Figure 4B:
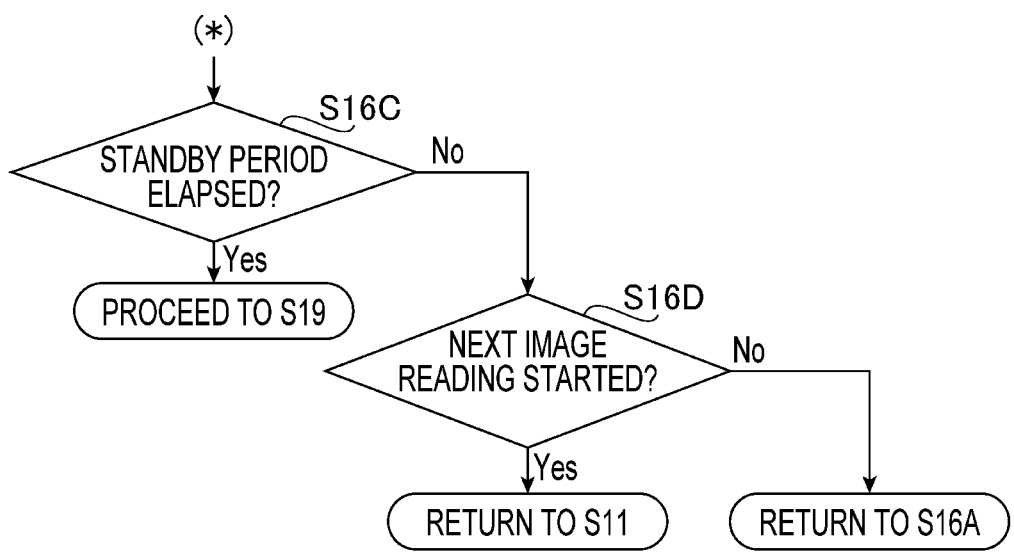

FIGS. 4A and 4B illustrate flows of steps to be executed by the controller 100 according to a program to implement a second operation. The program to be executed by the controller 100 may be stored in, for example, the ROM 102.

The second operation may be activated when, for example, the user sets a sheet of original document on the document base 11, closes the document cover 12, and operates the operation unit 63 to press a button (not shown) to input a command for copying. According to the operation corresponding to the copying command, the second operation illustrated in the flowcharts shown in FIGS. 4A and 4B is executed by the controller 100.

As shown in FIGS. 4A and 4B, the second operation to be executed by the controller 100 of the printing apparatus 1 in the modified example may be similar to the first operation described above in the previous embodiment except for a behavior that the controller 100 executes a flushing process after changing the standby period from the first period to the second period and after elapse of a third period.

The flushing process includes a process, in which the printing head 55 is manipulated to eject ink through the ink ejecting surface, not for printing an image on the printable medium 81, but for once removing the ink from the ink ejecting surface of the printing head 55. Through the flushing process, meniscus of the ink on the ink ejecting surface of the printing head 55 may be restored and maintained preferably, and incorrect ejection of the ink by the printing head 55 may be restrained.

In the second operation, in S16, the controller 100 executes the changing process, in which the controller 100 changes the standby period from the first period to the second period. Following S16, in S16A, the controller 100 determines whether the third period since the completion of the printing operation has elapsed. The third period refers to a length of a time period, which is between the first period and the second period. The third period is longer than a time period, which is required for the cap 61 to be moved to cap the printing head 55 and may be determined discretionarily by, for example, a manufacturer. The third period may be stored in the ROM 102 or the EEPROM 104.

In S16A, if the controller 100 determines that the third period since the completion of the printing operation elapsed (S16A: YES), in S16B, the controller 100 executes the flushing process and proceeds to S17, which is described above in the previous embodiment.

On the other hand, in S16A, if the controller determines that the third period has not elapsed since the completion of the printing operation (S16A: NO), in S16C, the controller 100 determines whether the standby period since the completion of the printing operation elapsed.

If the controller 100 determines that the standby period since the completion of the printing operation has not elapsed (S16C: NO), in S16D, the controller 100 determines whether a next image reading operation started. If the controller determines that the next image reading operation started (S16D: YES), the controller 100 returns to S11 and repeats the flow of S11-S18. On the other hand, if the controller 100 determines that no next image reading operation started (S16D: NO), the controller 100 returns to S15 and repeats the flow of S15-S18 until the standby period elapses.

Meanwhile, in S16C, if the controller 100 determines that the standby period since the completion of the printing operation elapsed (S16C: YES), in S19, the controller 100 executes the capping process, which is described above in the previous embodiment. The flow after S19 is executed by the controller 100 similarly to the flow described above in the first embodiment.

The printing apparatus 1 in the modified example described above may provide the same or similar effects and usability as the printing apparatus 1 described in the previous embodiment.

Further, according to the modified example of the printing apparatus 1, the flushing process is executed when the controller 100 extends the standby period to the second period and after the elapse of the third time since the completion of the printing operation. Therefore, the printing head 55 may be more effectively prevented from drying than the printing apparatus 1 in the previous embodiment.

Second Embodiment

[Behaviors of the Printing Apparatus]

Next, behaviors of the printing apparatus 1 in a second embodiment will be described with reference to FIG. 5. The behaviors of the printing apparatus 1 in the second embodiment may be similar to those in the printing operation of the printing apparatus 1 in the first embodiment except for a behavior that the controller 100 executes a display process, in which the controller 100 displays information, regarding an option whether a next image reading operation should be continuously executed, through the display unit 62, and except for a behavior that the controller 100 may execute the changing process based on a user's selection that the next image reading operation should be executed continuously.

Figure 5:
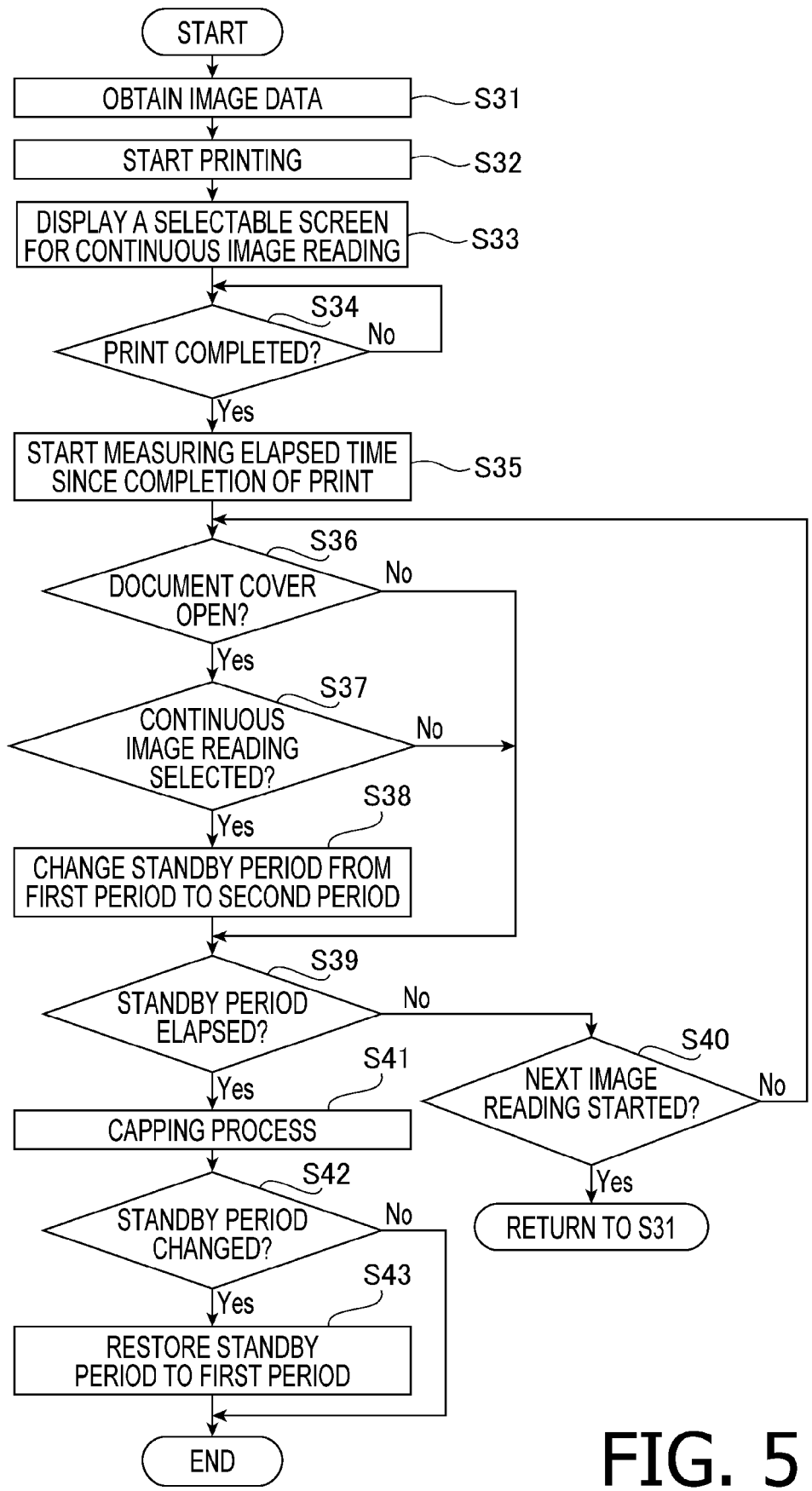
FIG. 5 is a flowchart to illustrate an operation to be executed by the controller of the printing apparatus according to a second embodiment of the present disclosure.

FIG. 5 illustrates a flow of steps to be executed by the controller 100 according to a program to implement a third operation. The program to be executed by the controller 100 may be stored in, for example, the ROM 102.

The third operation may be activated when, for example, the user sets a sheet of original document on the document base 11, closes the document cover 12, and operates the operation unit 63 to press a button (not shown) to input a command for copying. According to the operation corresponding to the copying command, the third operation illustrated in the flowchart shown in FIG. 5 is executed by the controller 100.

As shown in FIG. 5, in an image reading process in S31, the controller 100 manipulates the image sensor 14 in the image reader unit 10 to read an image on the sheet of original document and generate image data. The controller 100 obtains the generated image data.

In S32, the controller 100 executes the printing operation, in which the printer unit 50 is manipulated to print the image by using the image data obtained in S31. In S33, the controller 100 manipulates the display unit 62 to display optional information.

The optional information may include a message to ask the user whether a next image reading operation should be continuously executed, and the message may include, for example, text, an icon, and/or a figure. The user may input a preference or selection regarding the next image reading operation through the operation unit 63. Optionally, the controller 100 may control the display unit 62 to cease displaying the optional information after a predetermined time period without the user's input. Further optionally, the predetermined time period may be shorter than the standby period for, for example, five (5) seconds.

In S34, the controller 100 determines whether the printing operation with the image data is completed. If the printing operation is determined to be completed (S34: YES), the controller 100 starts the standby process and proceeds to S35.

In S35, the controller 100 starts measuring a length of a time period elapsed since the completion of the printing operation with the printable medium 81, i.e., from the time, at which the controller 100 made the affirmative determination in S34 (S34: YES), and writes each elapsed time period in the elapse time memory 103b. In S36, the controller 100 determines whether the document cover 12 is open based on the signals output from the cover sensor 13.

If the controller 100 determines that the document cover 12 is not open (S36: NO), the controller 100 proceeds to S39, which will be described later. If the controller 100 determines that the document cover 12 is open (S36: YES), the controller 100 proceeds to S37.

In S37, the controller 100 determines whether the user input the selection for the continued next image reading operation through the operation unit 63 in response to the optional information displayed through the display unit 62 in S33.

If the controller 100 determines that the user did not input the selection for the continued next image reading operation through the operation unit 63, or the user input no selection through the operation unit 63 (S37: NO), the controller 10 proceeds to S39. On the other hand, if the controller 100 determines that the user input the selection for the continued next image reading operation through the operation unit 63 (S37: YES), the controller 100 proceeds to S38.

In S38, the controller executes a changing process, in which the controller 100 changes the standby period from the first period to the second period. More specifically, the controller 100 sets the first-period flag and the second-period flag, which are stored in the standby period memory 103a, off and on respectively.

In S39, the controller 100 determines whether the standby period since the completion of the printing operation has elapsed. If the controller 100 proceeded to S39 from S36 or S37, skipping S38, the standby period remains unchanged as the first period. On the other hand, if the controller 100 proceeded to S39 after S38, the standby period has been changed to the second period.

In S39, if the controller 100 determines that the standby period since the completion of the printing operation, having been measured since S35, has not elapsed (S39: NO), in S40, the controller 100 determines whether a next image reading operation started. If the controller 100 determined that the next image reading operation started (S40: YES), the controller 100 returns to S31 and repeats a flow of S31-S40. On the other hand, if the controller 100 determines that no next image reading operation started (S40: NO), the controller 100 returns to S36 and repeats a flow of S36-S40 until the standby period elapses.

Meanwhile, in S39, if the controller 100 determines that the standby period since the completion of the printing operation elapsed (S39: YES), in S41, the controller 100 executes a shifting process, in which the controller 100 manipulates the printer unit 50 to shift from the second condition to the first condition, i.e., the capping process to place the cap 61 to contact the ink ejecting surface of the printing head 55.

In S42, the controller 100 determines whether the standby period has been changed. If the controller 100 determines that the standby period has been changed from the first period to the second period in S38 (S42: YES), in S43, the controller 100 restores the standby period to the first period. The controller 100 ends the third operation. On the other hand, in S42, if the standby period has not been changed in S38 from the first period to the second period (S42: NO), the controller 100 ends the first operation without changing the standby period.

According to the printing apparatus 1 described above in the second embodiment, if the user selects to execute the next image reading operation continuously after the completion of the preceding printing operation, the standby period is extended so that the second condition in the printer unit 50, in which the printing head 55 is not covered by the cap 61, is maintained, and the next printing operation may be started smoothly and promptly with the uncapped printing head 55. Thus, when the printing operations are executed one after another sequentially and continuously, onset of the latter printing operation may be restrained from delayed.

Third Embodiment

[Behaviors of the Printing Apparatus]

Next, behaviors of the printing apparatus 1 in a third embodiment will be described with reference to FIG. 6. The behaviors of the printing apparatus 1 in the third embodiment may be similar to those in the printing operation of the printing apparatus 1 in the first embodiment except for a behavior that the controller 100 executes the changing process on condition that the controller 100 detects presence of the printable medium 81 in the feeder tray 51 by the output from the media sensor 15.

Figure 6:
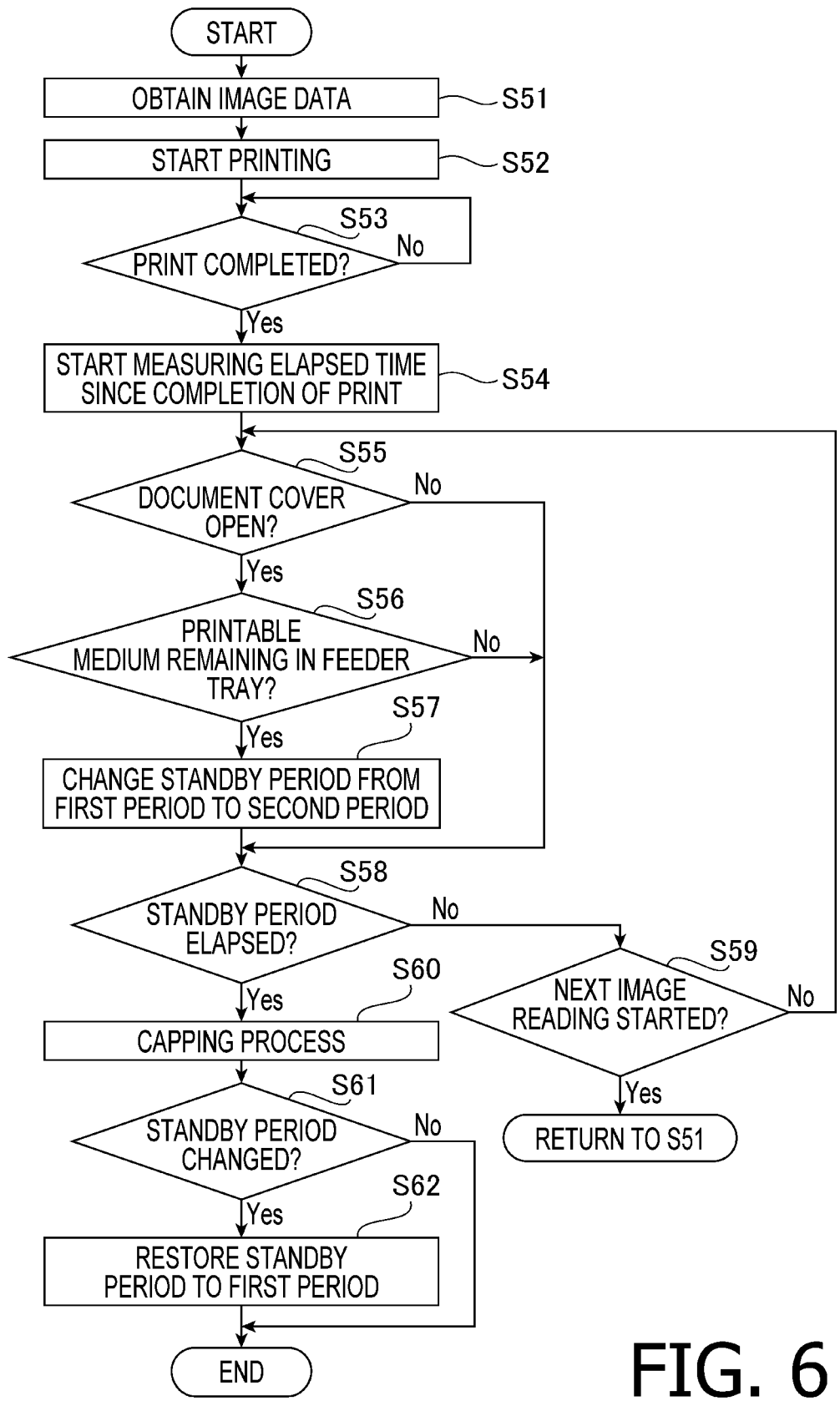
FIG. 6 is a flowchart to illustrate an operation to be executed by the controller of the printing apparatus according to a third embodiment of the present disclosure.

FIG. 6 illustrates a flow of steps to be executed by the controller 100 according to a program to implement a fourth operation. The program to be executed by the controller 100 may be stored in, for example, the ROM 102.

As shown in FIG. 6, in an image reading process in S51, the controller 100 manipulates the image sensor 14 in the image reader unit 10 to read an image of the original document and generate image data. The controller 100 obtains the generated image data.

In S52, the controller 100 executes the printing operation, in which the printer unit 50 is manipulated to print the image by using the image data obtained in S51. In S53, the controller 100 determines whether the printing operation with the image data is completed. If the printing operation is determined to be completed (S53: YES), the controller 100 starts the standby process and proceeds to S54.

In S54, the controller 100 starts measuring a length of a time period elapsed since the completion of the printing operation with the printable medium 81, i.e., from the time, at which the controller 100 made the affirmative determination in S54 (S54: YES), and writes each elapsed time period in the elapse time memory 103*b*. In S55, the controller 100 determines whether the document cover 12 is open based on the signals output from the cover sensor 13.

If the controller 100 determines that the document cover 12 is not open (S55: NO), the controller 100 proceeds to S58, which will be described later. If the controller 100 determines that the document cover 12 is open (S55: YES), the controller 100 proceeds to S56.

In S56, the controller 100 determines based on the output from the media sensor 15 whether a printable medium 81 remains present in the feeder tray 51. If the controller 100 determines that no printable medium 81 remains in the feeder tray 51 (S56: NO), the controller proceeds to S58. If the controller 100 determines that a printable medium 81 remains present in the feeder tray 51 (S56: YES), the controller 100 proceeds to S57.

In S57, the controller executes a changing process, in which the controller 100 updates the standby period from the first period to the second period. More specifically, the controller 100 sets the first-period flag and the second-period flag, which are stored in the standby period memory 103*a*, off and on respectively.

In S58, the controller 100 determines whether the standby period since the completion of the printing operation, having been measured since S54, has elapsed. If the controller 100 proceeded to S58 from S55 or S56, skipping S57, the standby period remains unchanged as the first period. On the other hand, if the controller 100 proceeded S57 after S58, the standby period has been changed to the second period.

In S58, if the controller 100 determines that the standby period since the completion of the printing operation has not elapsed (S58: NO), in S59, the controller 100 determines whether a next image reading operation started. If the controller 100 determined that the next image reading operation started (S59: YES), the controller 100 returns to S51 and repeats a flow of S51-S59. On the other hand, if the controller 100 determines that no next image reading operation started (S59: NO), the controller 100 returns to S55 and repeats a flow of S55-S59 until the standby period elapses.

Meanwhile, in S58, if the controller 100 determines that the standby period since the completion of the printing operation elapsed (S58: YES), in S60, the controller 100 executes a shifting process, in which the controller 100 manipulates the printer unit 50 to shift from the second condition to the first condition, i.e., the capping process to place the cap 61 to contact the ink ejecting surface of the printing head 55.

In S61, the controller 100 determines whether the standby period has been changed. If the controller 100 determines that the standby period has been changed from the first period to the second period in S57 (S61: YES), in S62, the controller 100 restores the standby period to the first period. The controller 100 ends the third operation. On the other hand, in S61, if the standby period has not been changed in S57 from the first period to the second period (S61: NO), the controller 100 ends the fourth operation without changing the standby period.

The printing apparatus 1 in the third embodiment described above may provide the same or similar effects and usability as the printing apparatus 1 described in the first embodiment.

According to the third embodiment described above, when no printable medium 81 remains in the feeder tray 51, it may be unlikely that the user would refill the feeder tray 51 with new printable media 81 before the second period elapses. Therefore, when no printable medium 81 remains in the feeder tray 51, the controller 100 does not extend the standby period to the second period but maintains the first period as the standby period and execute the standby process.

Thereby, while the continued printing operation before elapse of the second period may not be expected, the printing head 55 may be prevented from standing by in the second condition for no continuous printing operation by the controller 100 extending the standby period. Therefore, the printing head 55 may be prevented from drying.

Although examples of carrying out the disclosure have been described, those skilled in the art will appreciate that there are numerous variations and permutations of the printing apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. A printing apparatus, comprising:
    an image reader unit, comprising a document base, a document cover, and a cover sensor configured to detect an opening-closing motion of the document cover;
    a printer unit configured to shift between a first condition, which requires a preparatory action in order to enable the printer unit to print an image, and a second condition, in which the printer unit is enabled to print the image through the preparatory action; and
    a controller configured to execute:
        an image reading process, in which the controller manipulates the image reader unit to read an original document placed on the document base and generate image data;
        a printing process, in which the controller manipulates the printer unit to print an image according to the generated image data on a printable medium;
        a standby process, in which the controller holds the printer unit in the second condition on standby for shifting to the first condition during a time period between completion of the printing process and elapse of a standby period;
        a shifting process, in which, after elapse of the standby period, the controller manipulates the printer unit to shift from the second condition to the first condition; and
        a changing process, in which, if the controller detects the document cover being open based on output from the cover sensor during the time period between completion of the printing process and elapse of the standby period, the controller changes the standby period from a first period to a second period that is longer than the first period, the first period being the standby period for the printer unit to be held on standby when the controller does not detect the document cover being open during the time period between completion of the printing process and elapse of the standby period.

2. The printing apparatus according to claim 1, further comprising:
    a display unit configured to display information to a user; and
    an operation unit configured to accept selection from the user,
    wherein the controller executes a display process, in which the controller manipulates the display unit to display optional information to ask the user whether, after completion of the image reading process, the image reading process is to be continued; and
    wherein the controller executes the changing process on condition that the user operates the operation unit during the display process to enter the selection for continuing the image reading process.

3. The printing apparatus according to claim 2,
    wherein the controller executes the standby process, in which the standby period is the first period, regardless of output from the cover sensor, without executing the changing process if the user operates the operation unit to enter selection not for continuing the image reading process.

4. The printing apparatus according to claim 1, further comprising:
    a feeder tray; and
    a medium sensor configured to detect the printable medium in the feeder tray,
    wherein the printer unit is configured to feed the printable medium from the feeder tray and print the image according to the image data on the printable medium being fed, and
    wherein the controller executes the changing process on condition that the controller detects the printable medium in the feeder tray based on the output from the medium sensor.

5. The printing apparatus according to claim 4,
    wherein the controller executes the standby process, in which the standby period is the first period, without executing the changing process if the controller detects no printable medium in the feeder tray.

6. The printing apparatus according to claim 1,
    wherein the printer unit comprises a printing head configured to eject ink at the printable medium and a cap configured to contact an ink ejecting surface of the printing head to cover the ink ejecting surface;
    wherein the first condition is a condition, in which the printing head is covered by the cap;
    wherein the second condition is a condition, in which the printing head is not covered by the cap; and
    wherein the preparatory action is an action to separate the cap from the printing head.

7. The printing apparatus according to claim 6,
    wherein the controller is configured to execute a flushing process, in which the printing head is manipulated to flush the ink from the ink ejecting surface when the printer unit is in the second condition; and
    wherein the controller is configured to execute the flushing process when a third period, which has a length between the first period and the second period, elapses.

8. A non-transitory computer-readable medium storing computer-readable instructions that are executable by a controller coupled with a printing apparatus, the printing apparatus comprising an image reader unit with a document base, a document cover, and a cover sensor configured to detect an opening-closing motion of the document cover; and a printer unit configured to shift between a first condition, which requires a preparatory action in order to enable the printer unit to print an image, and a second condition, in which the printer unit is enabled to print the image through the preparatory action, the computer-readable instructions causing the printing apparatus, when executed by the controller, to perform:
- an image reading process, in which the controller manipulates the image reader unit to read an original document placed on the document base and generate image data;
- a printing process, in which the controller manipulates the printer unit to print an image according to the generated image data on a printable medium;
- a standby process, in which the controller holds the printer unit in the second condition on standby for shifting to the first condition during a time period between completion of the printing process and elapse of a standby period;
- a shifting process, in which, after elapse of the standby period, the controller manipulates the printer unit to shift from the second condition to the first condition; and
- a changing process, in which, if the controller detects the document cover being open based on output from the cover sensor during the time period between completion of the printing process and elapse of the standby period, the controller changes the standby period from a first period to a second period that is longer than the first period, the first period being the standby period for the printer unit to be held on standby when the controller does not detect the document cover being open during the time period between completion of the printing process and elapse of the standby period.

\* \* \* \* \*